US005846591A

United States Patent [19]

Satake et al.

[11] Patent Number: 5,846,591

[45] Date of Patent: Dec. 8, 1998

[54] PRETREATMENT PROCESS IN FLOUR MILLING METHOD

[75] Inventors: Satoru Satake, Tokyo; Shigeharu Kanemoto, Hiroshima; Nobuhiro Matsumoto, Hiroshima; Yoshihiro Tokui, Hiroshima, all of Japan

[73] Assignee: Satake Corporation, Tokyo, Japan

[21] Appl. No.: 854,699

[22] Filed: May 12, 1997

[30] Foreign Application Priority Data

May 31, 1996 [JP] Japan .................................... 8-160970

[51] Int. Cl.[6] ........................................................ A23P 1/00

[52] U.S. Cl. ........................... 426/483; 426/507; 426/622

[58] Field of Search ..................................... 426/482, 483, 426/507, 622

[56] References Cited

U.S. PATENT DOCUMENTS 4,741,913 5/1988 Satake ..................................... 426/483

5,082,680 1/1992 Tkac ........................................ 426/483

*Primary Examiner*—George Yeung

*Attorney, Agent, or Firm*—Fish & Richardson P.C.

[57] ABSTRACT

A pretreatment process in a flour milling method in which raw wheat grains are first polished and the polished grains are ground and milled for producing end flour, includes a first, a second, a third polishing step, and a step of adding water. In the first polishing step a pericarp of each wheat grain is removed, in the second polishing step a seed coat of each raw wheat grain is removed, and in the third polishing step a part of cell walls of aleuron layer cells that was in contact with the removed seed coat is removed so that a cell membrane of the aleuron layer cell is caused to be ruptured and that a substance in the aleuron layer cell is caused to be in a state which permits the substance to flow out. In step of adding water, by adding the water to each raw wheat grain, the substance in the aleuron layer cells is caused to flow out from the aleuron layer cells, resulting in producing a polished grain in a state in which the substance in the aleuron layer cell has been separated from each raw wheat grain. It is possible to increase the yield of the end flour collected by the subsequent grinding operation.

2 Claims, 5 Drawing Sheets

PRETREATMENT PROCESS IN FLOUR MILLING METHOD

BACKGROUND OF THE INVENTION (1) Field of the Invention

The present invention relates to a flour milling method for such grains as wheat grains, and more particularly to a pretreatment process in the flour milling method in which polishing operations are carried as a pretreatment process in the flour milling method.

(2) Description of the Related Art

In each wheat grain milled for producing flour, as shown in FIG. 6, an endosperm 511 which becomes an end flour product is covered by a husk portion. Sequentially from the outside of the wheat grain, the husk portion has a pericarp 516 formed of an outer epidermis 512, a middle layer 513, cross cells 514, and tube cells 515, the pericarp 516 being comparatively easy to remove; a seed coat 518 formed of nucellar tissue 517, the seed coat being comparatively difficult to remove; and an aleuron layer 520 formed of aleuron layer cells 519. The husk portion has a high ash content so that, when it is mixed into the end flour obtained by the grinding, the quality of the end flour is degraded. Thus, the efforts are being made so as to enhance the yield of the end flour by collecting the endosperm 511 in a powder form in such a way that the mixing of the husk portion therein is avoided.

The conventional methods include a method in which, in order to avoid the mixing of the husk portion into the end flour, the pericarp 516, the seed coat 518 and the aleuron layer 520 (the aleuron layer being a part of the endosperm but, in an ordinary flour milling, this is removed as the husk portion) are first removed for the grains to become polished grains, and then these polished grins are subjected to the grinding to produce the end flour.

However, with the above method, since it is difficult to make a complete removal and separation of only the husk portion from the endosperm 511, a part of the endosperm is removed together with the husk portion thus enabling the removal of the husk portion from the endosperm. In this way, the ash content which is a cause for the degradation of the quality of the end flour can be reduced but, at the same time, the yield of the end flour is also lowered, which is a problem in this conventional method.

There is another conventional method in which it is attempted to separate and remove only the pericarp 516 and the seed coat 518 with the aleuron layer 520 left in place so as not to lower the yield of the flour. However, a problem in this method is that, since the aleuron layer 520 has an ash content to the highest extent (the ash content in the substance 521 in the aleuron layer cells 519 is especially high), the end flour suffers from the degradation because of the high ash content.

SUMMARY OF THE INVENTION

An object of the present invention, therefore, is to overcome the problems existing in the prior art, and to provide a pretreatment process in a flour milling method, whereby the end flour of high quality is produced without the yield being lowered.

According to an aspect of the invention, there is provided a pretreatment process in a flour milling method in which raw wheat grains are first polished, and the grains thus polished are ground and milled for producing end flour, the pretreatment process comprising:

a first polishing step in which a pericarp of each wheat grain is removed;

a second polishing step in which a seed coat of each raw wheat grain is removed;

a third polishing step in which a part of cell walls of aleuron layer cells that was in contact with the removed seed coat of each raw wheat grain is removed such that a cell membrane of each aleuron layer cell is caused to be ruptured and that a substance in each aleuron layer cell is caused to be in a state which permits the substance to flow out; and a step of adding water in which, by adding the water to each raw wheat grain, the substance in the aleuron layer cells is caused to flow out from the aleuron layer cells, resulting in producing a polished grain in a state in which the substance in the aleuron layer cells has been separated from each raw wheat grain.

According to the invention, the removal of the pericarp and the seed coat of the raw wheat grains is made by the polishing operations. During the polishing, a part of the cell membranes of the aleuron layer cells is ruptured and the substance in the aleuron layer cells becomes ready to flow out. The grains in this state are subjected to water so that the substance in the aleuron layer cells flow out together with the water with the grains resulting in polished grains in which the substance in the aleuron layer cells has been removed.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENT OF THE INVENTION

Figure 1:
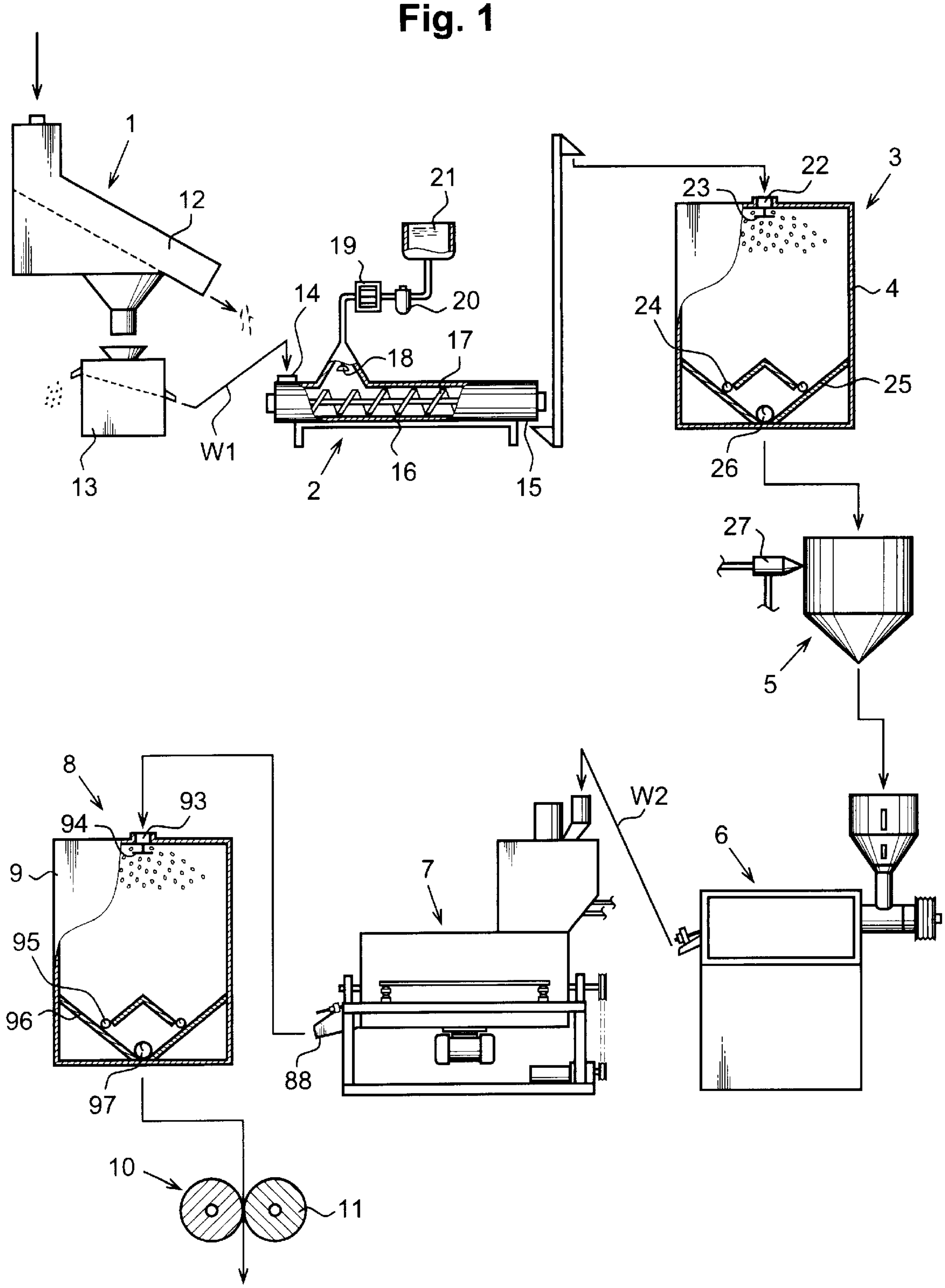
FIG. 1 is a front view showing a general arrangement of a flour milling apparatus used for explaining a method according to the invention.

Now, a preferred embodiment of the invention is explained with reference to FIG. 1. As means for carrying out treatments before the processing by the polishing means 6, there are sequentially provided a separator unit 1, a first water adding unit 2, a tempering tank 4 serving as a first conditioning unit 3, and a water adding tank 5. Means for carrying out treatments after the processing by the polishing means 6 include a second water adding unit 7 and a tempering tank 9 as a second conditioning unit 8, and means for carrying out treatments after the tempering tank 9 include a break roll machine 11 serving as a grinding unit 10.

The first means among the overall flour milling means is the separator unit 1 which includes a coarse separator 12 whose function is to remove comparatively light impurities such as straws, plants, wastes and dust, and a stone remover 13 whose function is to remove comparatively heavy impurities such as metal and stone pieces from the raw wheat grains that are taken out from, for example, a silo (not shown) to store the raw wheat grains.

Next to the separator unit 1 is provided the first water adding unit 2 with a passage way W1 being interposed. In the first water adding unit 2, there is provided a cylindrical trough 16 which has an inlet 14 for the grains at one end, an outlet 15 at the other end and a screw conveyor 17 inside thereof. Above the cylindrical trough 16, there is provided a shower nozzle 18 which is connected to a water tank 21 through a heater 19 and an electromagnetic valve 20.

The outlet 15 of the first water adding unit 2 is connected to a feeding port 22 of the tempering tank 4 as the first conditioning unit 3. The feeding port 22 has a scattering vane means 23 which hangs and rotates therein, and the bottom of the tempering tank 4 has a pair of rotary valves 24 which horizontally extend therein. Underneath the rotary valves 24, there is provided a receiving trough 25 which has a discharging screw conveyor 26 therein. One end of the discharging screw conveyor 26 is connected to an inlet opening of the water adding tank 5 equipped with a water adding nozzle 27. A discharge opening of the water adding tank 5 is connected to the polishing means 6.

Next, the polishing means 6 is explained with reference to FIG. 2. The polishing means 6 in this embodiment include a friction polishing unit 28 which performs friction polishing operation and an abrasion polishing unit 29 which performs abrasion polishing operation. These two units are connected with each other in series.

Figure 2:
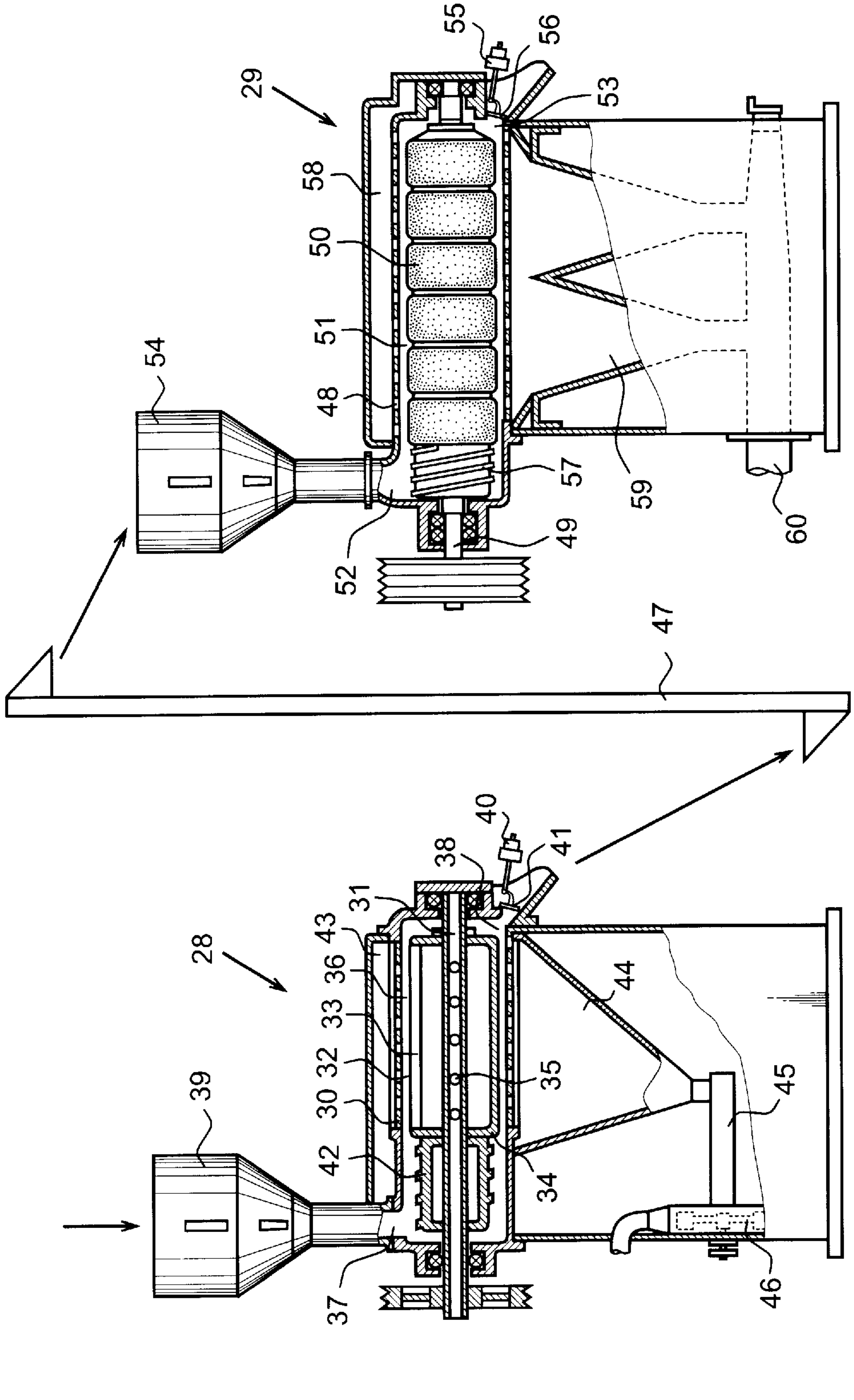
FIG. 2 is an enlarged rear view, partially in section, showing a general arrangement of a polishing means in the apparatus shown in FIG. 1.

In the friction polishing unit 28, as shown in FIG. 2, a hollow shaft 31 extends horizontally through the inside of a bran removing polishing cylinder 30 and is rotatable therein. The hollow shaft 31 opens at its one end and is connected to an air supplying means (not shown), and the hollow shaft 31 rotatably carries a friction polishing rotor 34 which is provided with stirring projections 32 and air jet slits 33. The friction polishing rotor 34 is hollow and, on a peripheral surface of the hollow shaft 31 within the friction polishing rotor 34, there are provided a plurality of air holes 35. The gap defined between the friction polishing rotor 34 and the bran removing polishing cylinder 30 constitutes a polishing chamber 36. One end of the polishing chamber 36 communicates with a feeding inlet 37 and the other end thereof communicates with an outlet 38. A feeding hopper 39 is provided at the feeding inlet 37, and a resisting lid 41 being urged by a weight 40 is provided at the outlet 38. Further, at a position near the feeding inlet 37, a grain conveying rotor 42 having screw vanes is rotatably provided on the hollow shaft 31, and a bran collecting chamber 43 is formed around the bran removing polishing cylinder 30. The bottom part of the bran collecting chamber 43 communicates with a bran collecting duct 45 and a bran collecting fan 46 through the bran collecting hopper 44. The outlet 38 of the friction polishing unit 28 is connected to an abrasion polishing unit 29 of the next stage through an elevator 47.

In the abrasion polishing unit 29, there is provided a main shaft 49 which extends through within the bran removing polishing cylinder 48 which is formed by a perforated wall. This main shaft 49 rotatably carries abrasion polishing rotors 50 formed by powder emery, and the gap between the abrasion polishing rotors 50 and the bran removing polishing cylinder 48 constitutes a polishing chamber 51. One end of the polishing chamber 51 communicates with a feeding inlet 52 and the other end thereof communicates with an outlet 53. A feeding hopper 54 is provided at the feeding inlet 52, and a resisting lid 56 being urged by a weight 55 is provided at the outlet 53. Further, at a position near the feeding inlet 52, a grain conveying rotor 57 having screw vanes is rotatably provided on the main shaft 49. Also, a bran collecting chamber 58 is formed around the bran removing polishing cylinder 48. The bottom part of the bran collecting chamber 58 communicates with a bran collecting duct 60 through the bran collecting hopper 59. The outlet 53 of the abrasion polishing unit 29 is connected to the second water addition unit 7 through a passage way W2.

Figure 3:
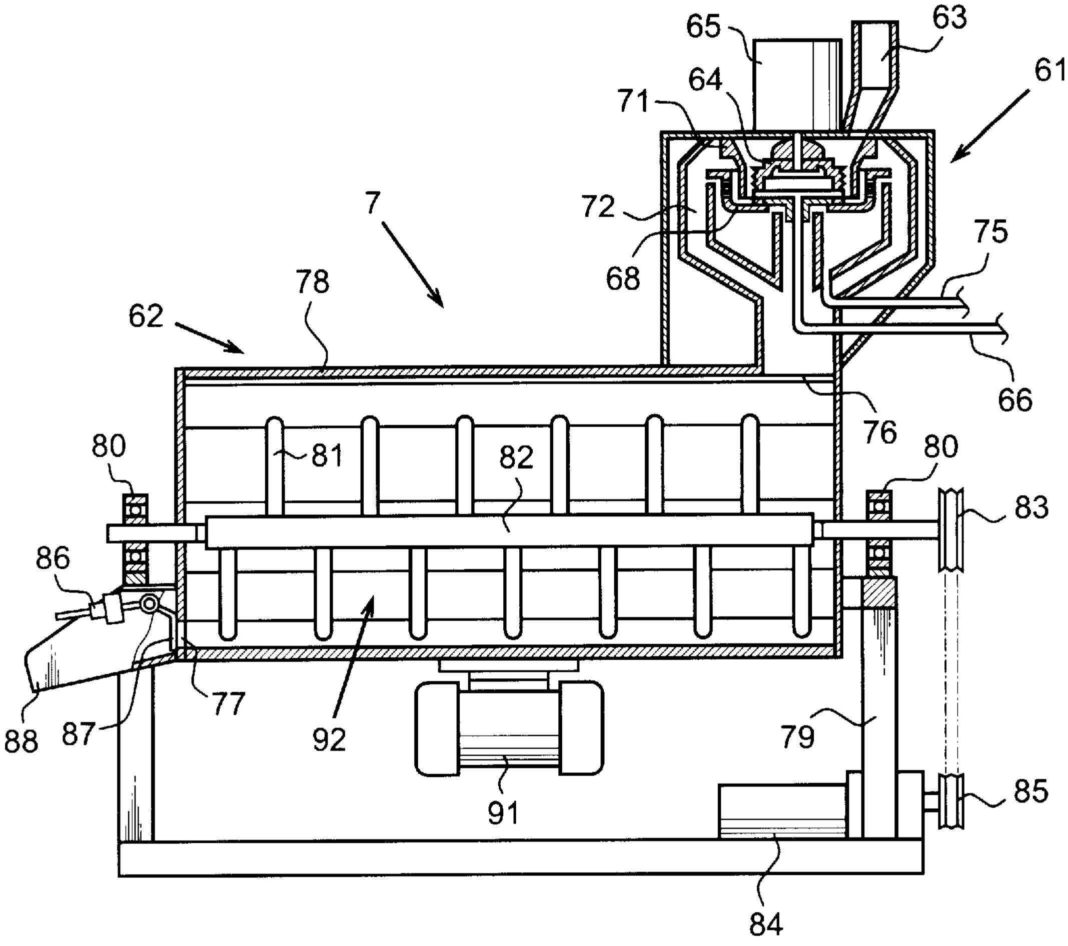
FIG. 3 is a vertical sectional view showing a second water adding unit in the apparatus shown in FIG. 1.
Figure 4:
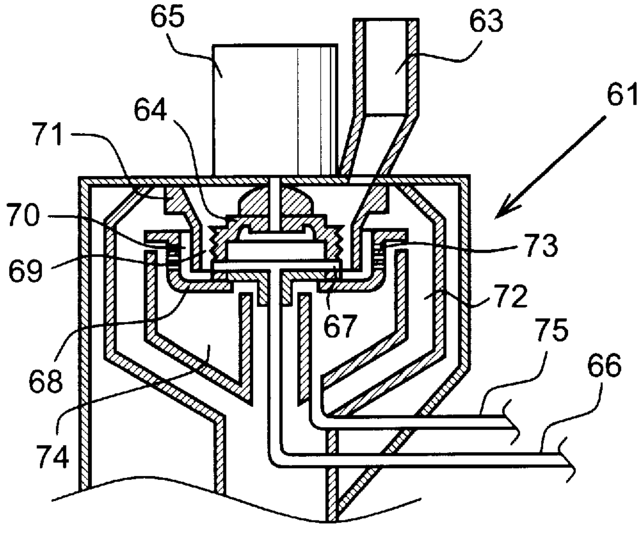
FIG. 4 is an enlarged sectional view showing a cleaning section in the second water adding unit.
Figure 5:
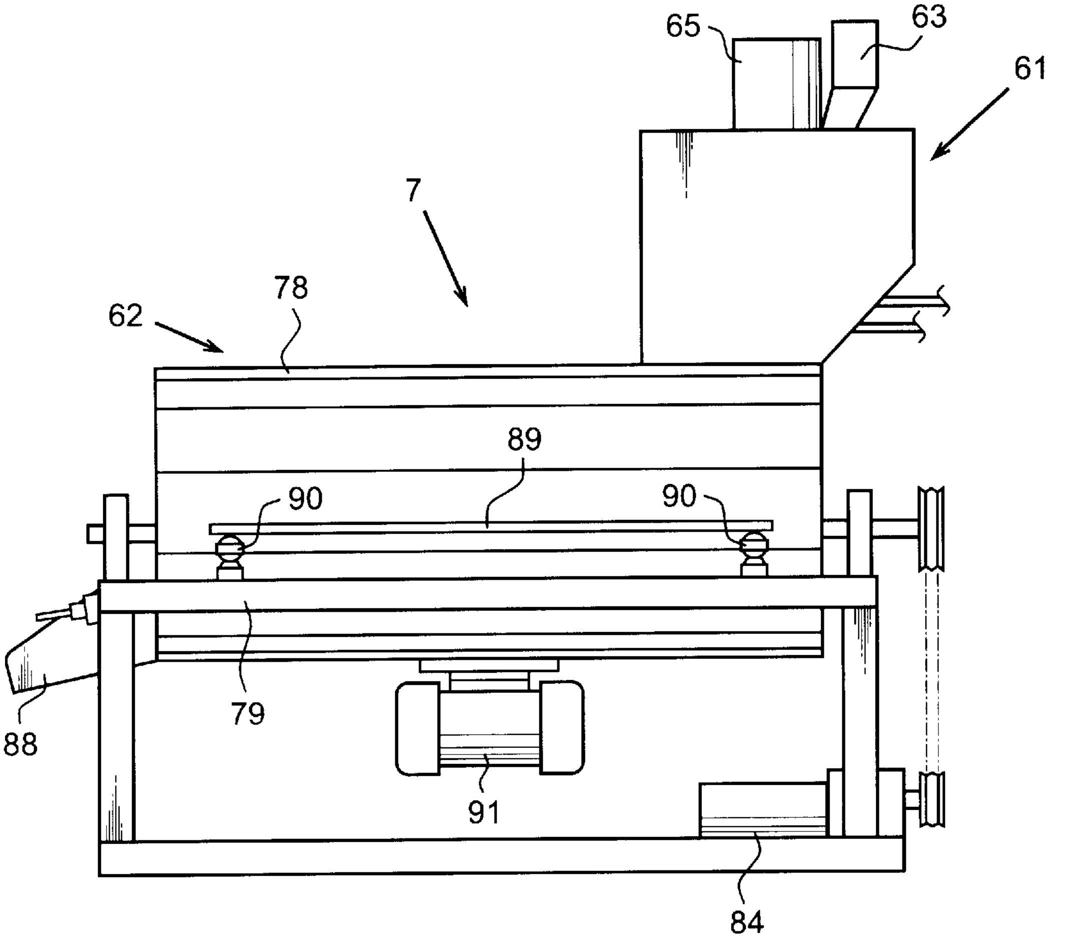
FIG. 5 is a front view showing the second water adding unit shown in FIG. 1.

Now, the second water adding unit 7 is explained hereunder with reference to FIGS. 3 to 5. The second water adding unit 7 is constituted by a cleaning section 61 and a transporting section 62 and, in the cleaning section 61, there is provided a screw rotor 64 which is rotated by a motor 65 for transporting the grains downwardly from a feeding trough 63. The screw rotor 64 is provided at its lower portion with a water supply port 67 (shown in FIG. 4), which is connected to a water supply duct 66. Fixed to the lower end of the screw rotor 64 is a plate-like rotary cylinder 68 which is bent upwardly and surrounds the periphery of the screw rotor 64. Between the screw rotor 64 and the rotary cylinder 68, there is provided, as shown in FIG. 4, a fixed cylinder 71 which defines a flow passage 69 directed downwardly to the side of the screw rotor 64 and a flow passage 70 directed upwardly to the side of the rotary cylinder 68 and which surrounds the screw rotor 64 from the above. At the side of the rotary cylinder 68, there is provided a transporting passage way 72 which supplies to the transporting section 62 the grains flowing down over the upper end of the rotary cylinder 68 from the flow passage 70. Also, a part of the rotary cylinder 68 is formed as a perforated wall 73, and the space between the rotary cylinder 68 and the transporting passage way 72 constitutes a collecting chamber 74 for collecting the matters passed through the perforated wall 73 and, to the collecting chamber 74, a discharging duct 75 for discharging the matters to the outside of the machine is connected.

The transporting section 62 is arranged such that, within a circular machine frame 78 which has at one end an inlet 76 connected to the transporting passage way 72 and at the other end an outlet 77 for the grains, there is provided a stirring unit 92 which has a main shaft 82 having thereon a plurality of stirring vanes 81 and which laterally and centrally extends through the machine frame 78 on a pair of bearings 80 fixed to a supporting frame 79. On one end of the main shaft 82, there is a pulley 83 which is coupled to a pulley 85 of a motor 84 by a V-belt, and the main shaft 82 is caused to rotate at an appropriate speed. The outlet 77 is provided with a resisting lid 87 which is urged by a weight 86 towards the outlet 77, and an outlet trough 88 for discharging the grains to the outside of the machine is connected to the outlet 77. As shown in FIG. 5, the machine frame 78 is supported on the supporting frame 79, with the machine frame being positioned horizontally or with the outlet 77 side thereof being slightly lower, by a supporting member 89 projecting from the machine frame 78 and a plurality of joining members 90. The machine frame 78 carries thereunder a vibrating motor 91 which generates vibrations.

Now, referring to FIG. 1 again, the outlet trough 88 of the second water adding unit 7 is connected to a supply port 93 of the tempering tank 9 of the second tempering unit 8. In the supply port 93, there is vertically provided a plurality of rotatable scattering vanes 94 and, at the bottom of the tank, there is laterally provided a pair of rotary valves 95. Also, under the rotary valves 95, there is a receiving trough 96 in which a discharging screw conveyor 97 is provided. The conveying end portion of the screw conveyor 97 is connected to the break roll machine 11 of the grinding unit 10 which is a first stage unit in the flour milling steps. As means for flour milling after the break roll machine 11, there are provided appropriate means which include a plurality of rolls, a sifter, and a purifier (not illustrated).

Now, the function of the apparatus as described above is explained.

The raw wheat grains taken out from, for example, a tank, undergo a process of removing impurities by the coarse separator 12 and also a further process of removing stone and metal pieces by the stone remover 13. The raw wheat grains from which foreign objects have been removed by the removal processes are first introduced into the first water adding unit 2 where the water is added to the grains by the shower nozzle 18. The amount of water is adjusted by the electromagnetic valve 20 such that the water content of the raw wheat grains becomes 12–14% (normal water content of raw wheat grains being about 11%). Where the temperature of water is low as in a winter season, the raising of water temperature by the heater 19 facilitates the water penetration. The raw wheat grains to which the water has been added are stirred and transported by the screw conveyor 17 and, during this period of time, the water added evenly penetrates into the inside of all the grains. Then, the raw wheat grains having been transported by an elevator to the feeding port 22 of the tempering tank 4 are filled in the tempering tank 4 while being scattered by the scattering vane means 23. The wheat grains in the tempering tank 4 are left alone as they are for 16–36 hours so that almost all of the water added penetrates into the endosperm of the wheat grains.

The wheat grains for which the tempering has been completed in the tempering tank 4 flow into the receiving trough 25 by the rotation of the rotary valves 24, 24 and are transported to the water adding tank 5 from the discharging screw conveyor 26. To the grains having been transported to the water adding tank 5, the atomized water is again added by the water adding nozzle 27. The amount of water added may be to the extent that the water penetrates the epidermis of the grains and be 0.5–2% by weight with respect to the grains. After the water has been added, the grains are held in the water adding tank 5 for 3–5 minutes for the water to penetrate into the epidermis of the grains. Thereafter, the grains are supplied to the polishing means 6.

In the polishing means 6, the grains are first fed into a feeding hopper 39 of the friction polishing unit 28 and conveyed by the grain conveying rotor 42 to the polishing chamber 36 where the grains are subjected to the polishing operation by the friction polishing rotor 34. The friction resistance in the grain surfaces is caused to increase by the water addition at the water addition tank 5 and, by the stirring action of the friction polishing rotor 34 rotating within the polishing chamber 36 of the friction polishing unit 28 and the stirring projections 32 thereof, the grains undergo grain-to-grain friction and the bran layer portions except a crease are removed. The bran that has thus been frictionally removed is caused to pass through the perforated wall of the bran removing polishing chamber 30 by the air jetted into the polishing chamber 36 through a hollow portion of the hollow-shaft 31, air holes 35 therein and jet air slits 33, and the bran is discharged to the outside of the machine by the bran collecting fan 46. The grains (polished grains) that gush out against the force of the resisting lid 41 from the outlet 38 of the friction polishing unit 28 are elevated by the grain elevator 47, fed into the feeding hopper 54 of the abrasion polishing unit 29 and conveyed to the polishing chamber 51 by the grain conveying rotor 57.

Figure 6:
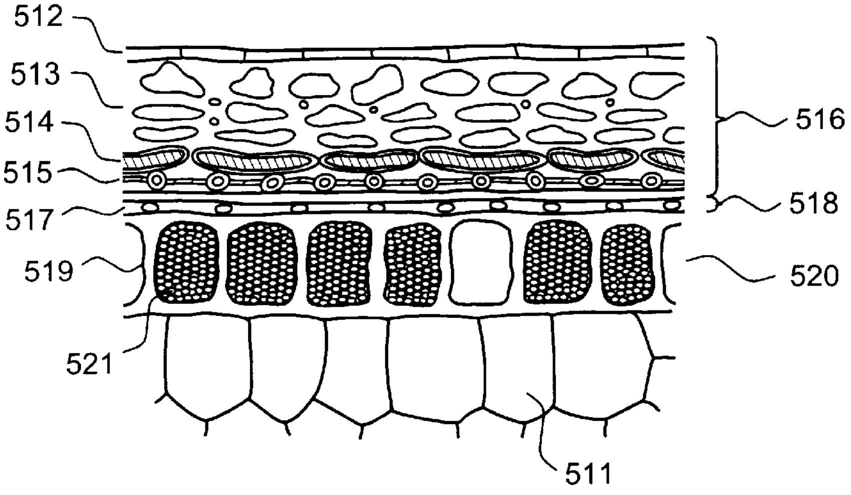
FIG. 6 is a side sectional view showing an internal state of an ordinary wheat grain.
Figure 7:
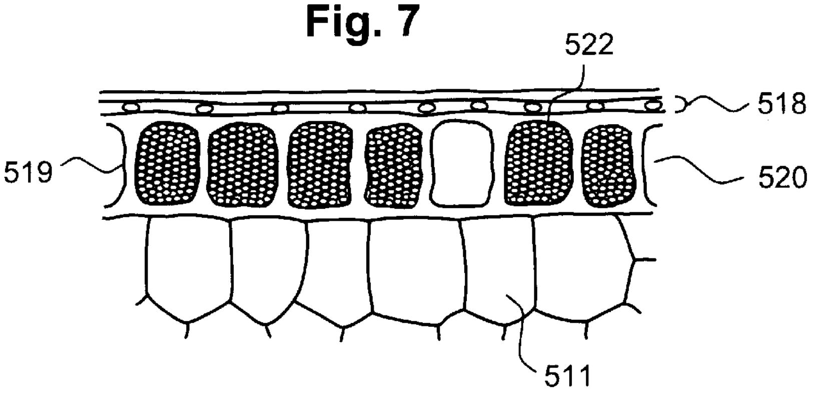
FIG. 7 is a side sectional view showing a state of a wheat grain after the pericarp has been removed by the friction polishing unit from the grain in the state shown in FIG. 6.

The function of the friction polishing unit 28 is to separate and remove, out of the bran layer portions of the grains, those portions that can easily be removed, hence down to the pericarp. This is explained with reference to FIGS. 6 and 7. From the state of the grains shown in FIG. 6, the removal of the outer epidermis 512, middle layer 513, cross cells 514 and tube cells 515 takes place as a result of the grain-to-grain friction caused by the friction polishing rotor 34 and, as shown in FIG. 7, the grains that have the seed coat 518, aleuron layer 520 and endosperm 511 are produced and supplied to the abrasion polishing unit 29. It can be appreciated that, by the operation of the friction polishing unit 28, the pericarp which is softer as compared with the seed coat is first removed.

At the abrasion polishing unit 29, the bran layer portions with the exception of the crease of the grains are removed while being pulverized by the powder emery carried around each of the abrasion polishing rotors 50 which rotates within the polishing chamber 51. The powdery bran portions removed pass through perforations of the bran removing polishing cylinder 48 and are discharged to the outside of the machine through the bran collecting hopper 59 and the bran collecting duct 60. The grains polished are forced out through the outlet 53 against the resisting lid 56 and fed to the feeding trough 63 of the second water adding unit 7 through the conveying passage way W2.

Measuring means are provided before and after the abrasion polishing unit 29 whereby the amount of the grains before the abrasion polishing and that after the abrasion polishing are compared to calculate the respective yields. If the lowering rate of the yield is within a range from 1.0 to 2.0% by weight (weight percent against the raw wheat grains), it indicates that the removal of the seed coat and a part of the aleuron layer (that was in contact with the seed coat) has been made without the endosperm of the grains being removed so that the substance within the aleuron layer cells is in a state which allows it to flow out from the aleuron layer cells. If the lowering rate in the yield is not within the range from 1.0 to 2.0% by weight, the weight 55 of the polishing unit 29 is adjusted either automatically or manually so as to maintain the values within the range.

Figure 8:
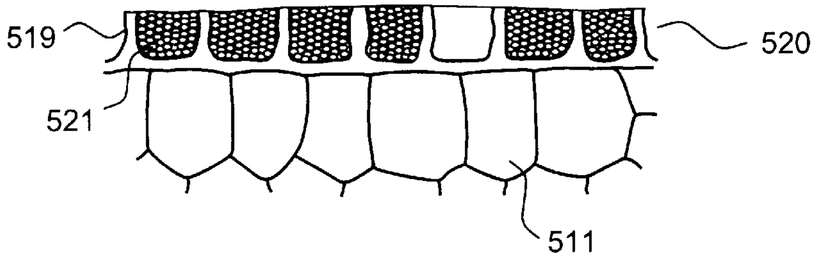
FIG. 8 is a side sectional view showing a state of a wheat grain after the seed coat and a part of the aleuron layer have been removed by the abrasion polishing unit from the grain in the state shown in FIG. 7.

The function of the abrasion polishing unit 29 is to separate the seed coat 518 and a part of the aleuron layer 520 and also to cause the rupture of the cell membranes 522 of the aleuron layer cells 519. This is explained with reference to FIGS. 7 and 8. From the state of the grains having the seed coat 518, aleuron layer 520 and endosperm 511 as shown in FIG. 7, the seed coat 518 is first removed at the abrasion polishing unit 29 by the abrasive force of the powder emery of the abrasion polishing rotors 50. Then, of the cell walls of the aleuron layer cells 519, the portions that were in contact with the seed coat are removed as shown in FIG. 8, and the cell membranes 522 of the aleuron layer cells 519 are broken and ruptured by the powder emery of the abrasion polishing rotors 50. Thus, the substance 520 within the aleuron layer cells 519 turns to a state which allows the substance to be washed out of the cells and, thereafter, the grains are fed into the second water adding unit 7.

The grains supplied from the second water adding unit 7 into the cleaning section 61 flow along the inner wall of the fixed cylinder 71 and reach the flow passage 69 between the fixed cylinder 71 and the screw rotor 64. At the flow passage 69, the grains are allowed to move down circularly due to the rotation of the screw rotor 64 and, during this time, the water is supplied radially to the grains from the water supply port 67 provided to the screw rotor 64. Although the grains to which the water is added are once stagnated at a lower portion of the flow passage 69, they are subjected to an appropriate pressure by the grains that flow down through the flow passage 69 due to the rotation of the screw rotor 64 so that they are subjected to the stirring and grain-to-grain friction actions which cause the grains to be forced up to the flow passage 70 between the fixed cylinder 71 and the rotary cylinder 68. During this time, the bran attached to the grains and the husk portion attached to the grains are removed into the water added and, at the same time, the substance in the cells of the aleuron layer is washed by the added water so as to cause the substance to flow out from the cells together with the added water.

At the flow path 70, the supplied water together with the bran, the husk portion and the substance in the cells are blown off from the perforated wall 73 by the centrifugal force of the rotary cylinder 68, are collected at the collecting chamber 74 and are discharged to the outside of the machine through the discharging duct 75. Also, the grains from which the bran, the husk portion and the substance in the cells have been removed, flow into the transporting passage way 72 from the upper periphery of the rotary cylinder 68 and are supplied to the conveying section 62 through the transporting passage way 72.

The polished grains supplied to the conveying section 62 are conveyed to the side of the outlet 77 from the side of the feeding port 76 while being subjected to the stirring action of the stirring vanes 81 so as not to stick together and being subjected to the vibrating action of the vibration motor 91 so as not to be stagnant within the machine frame 78. During this period, the water adhered to grain surfaces penetrates into the inside of the grains. The grains having reached the outlet 77 shows that the water has penetrated into the inside of the grains from their surfaces so that the grains are not caused to stick together, and the grains are discharged to the discharging trough 88 from the outlet 77 against the resisting force of the resisting lid 87.

Figure 9:
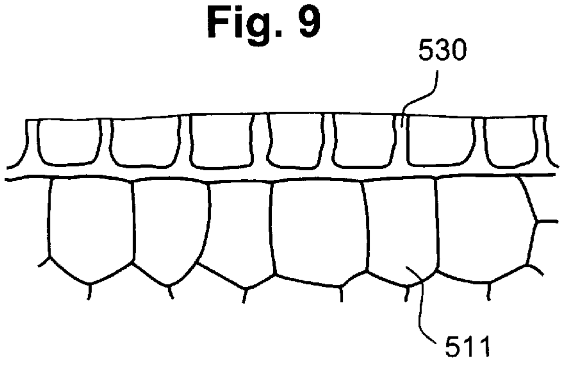
FIG. 9 is a side sectional view showing a state of a wheat grain after the substance in the cell forming the aleuron layer has been removed by the second water adding unit from the grain in the state shown in FIG. 8.

The function of the second water adding unit 7 is to cause the substance in the aleuron layer cells to flow out and to be separated from the grains. This is explained with reference to FIGS. 8 and 9. The grains to be fed to the second water adding unit 7 is in a state in which, at least that portion of the cell walls of the aleuron layer cells 519 which was in contact with the seed coat has been removed as shown in FIG. 8, and the substance 520 in the aleuron layer cells 519 is ready to flow out. In this state, the water added to the grains causes the substance 520 in the cells to be washed out and, as shown in FIG. 9, the grains (polished grains) remain only with a part of the cell walls 530 of the aleuron layer cells whose ash content is comparatively small and the entire endosperm 511.

In the conveying section 62, in order to cause the water on the grain surfaces to penetrate into the grains in such a way that the grains do not stick together, the stirring and vibration action may be subjected to the grains for at least 3 minutes and, in this connection, appropriate adjustments may be made for the amount of the grains fed to the second water adding unit 7 and for the resisting force of the resisting lid 87 by the weight 86 and the vibration number and width of the vibration motor 91, which depend on the amount of the water added to the grains.

For the grains discharged from the second water adding unit 7 to be in a condition suited for the subsequent grinding process, and also for the water content of the end flour obtained by the grinding process to have such water content as suited for a subsequent use of the end flour, the water content of the grains may adjusted to 15–17% by the second water adding unit 7.

The grains discharged from the discharging trough 88 of the second waster adding unit 7 are conveyed to the tempering tank 9 of the second tempering unit 8 where they are filled in the tempering tank while being scattered by the scattering vanes 94 of the tempering tank 9. The tempering time in the tempering tank 9 may be as short as 0.5–2 hours since the water content of the epidermis of the grains has already fairly satisfactorily adjusted by the first water adding unit 2 and the first tempering unit 3.

The grains whose tempering has been completed by the tempering tank 9 flow into the receiving troughs 96 in each of which the rotary valve 95 rotates, and are discharged to the outside of the machine by the discharging screw conveyor 97. Thereafter, the grains are fed into the break rolls 11 of the grinding unit 10 for the grinding process.

Detailed explanation of the operations that take place subsequent to the grinding unit 10 is omitted here but, in such operations, the endosperm is taken out in the form of coarse particles by the step-by-step grinding of the polished grains using various break roll machines, is classified by various sifters, and further selected and purified by purifiers, followed by the grinding by use of roll means (smooth rolls) to produce the end flour.

In the above explained embodiment of the invention, the polishing means 6 is constituted by the friction polishing unit 28 of a lateral shaft type and the abrasion polishing unit 29 of a lateral shaft type. However, the means may well be in a vertical shaft type with the friction polishing rotor and the abrasion polishing rotors being arranged on a single vertical shaft.

Also, in the explained embodiment of the invention, the polishing of the raw wheat grains is conducted by the friction polishing unit 28 and the abrasion polishing unit 29, but this polishing may well be carried out all by the abrasion polishing unit 29. In such a case, by making the adjustment of, for example, the resisting force of the resisting lid 56, only the abrasion polishing operation enables the removal of the pericarp, seed coat and aleuron layer and the rupturing of the aleuron layer cell membrane. However, since the pericarp is softer as compared with the seed coat and can be easily removed by the friction operation, a more efficient method is the method explained as the embodiment of the invention wherein the pericarp is first removed by the friction polishing operation followed by the abrasion polishing operation which removes the seed coat and the aleuron layer.

According to the method of the invention in which the raw wheat grains are first polished, and the polished grains are ground for producing the end flour, the pericarp and the seed coat of the raw wheat grains are peeled and removed, and the polished grains in the form in which the aleuron layer cell membranes have been destructed are subjected to the water addition so that the substance in the aleuron layer cells flows out and is separated from the polished grains. In this way, the polished grains fed to the grinding unit are in a state in which the endosperm is the same size as that in the raw wheat grain without being removed at all and in which most of the cell walls of the aleuron layer cells remains. Moreover, since the pericarp, the seed coat and the substance in the aleuron layer cells in which the ash content is high have been removed, it is possible to increase the yield of the end flour collected by the grinding operation and to obtain the end flour of high quality and low ash content.

For removing the aleuron layer cells, the abrasion polishing is effective in breaking and rupturing the cell membranes of the aleuron layer cells.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. A pretreatment process in a flour milling method in which raw wheat grains are polished, and the grains thus polished are ground and milled for producing end flour, said pretreatment process comprising:

a first polishing step in which a pericarp of each raw wheat grain is removed;

a second polishing step in which a seed coat of each raw wheat grain is removed;

a third polishing step in which cell wall portions of aleuron layer cells in contact with the removed seed coat are removed, wherein the third polishing step causes a cell membrane of each aleuron layer cell to rupture and expose a cell internal substance having a high ash content percentage; and a fourth step of adding water to cause the exposed cell internal substance in said aleuron layer cells to flow out of the aleuron layer cells, thereby resulting in a polished grain with a substantial part of the cell, walls remaining thereon and in which the cell internal substance in said aleuron layer cells has been separated from each raw wheat grain.

2. The pretreatment process of claim 1, in which a reduction rate in yield after said second and third polishing steps of the raw wheat grain is about 1.0–2.0% by weight when the weight percent of the raw grains is 100.

* * * * *

UNITED STATES PATENT AND TRADEMARK OFFICE
CERTIFICATE OF CORRECTION

PATENT NO. : 5,846,591

DATED : December 8, 1998

INVENTOR(S) : Satoru SATAKE et al.

It is certified that error appears in the above-identified patent and that said Letters Patent is hereby corrected as shown below:

At column 10, line 17 (Claim 1), after "cell" delete ",".

Signed and Sealed this

Eighteenth Day of May, 1999

Attest:

Q. TODD DICKINSON

*Attesting Officer*

*Acting Commissioner of Patents and Trademarks*